United States Patent [19]

Cecil

[11] 4,166,941
[45] Sep. 4, 1979

[54] GUIDANCE SYSTEM FOR ARC WELDER

[75] Inventor: Shelby Cecil, Medina, Ohio

[73] Assignee: C.R.O., Inc., Menomonee Falls, Wis.

[21] Appl. No.: 484,859

[22] Filed: Jul. 1, 1974

Related U.S. Application Data

[63] Continuation-in-part of Ser. No. 874,153, Nov. 5, 1969.

[51] Int. Cl.² ............................................... B23K 9/12
[52] U.S. Cl. .................................. 219/124.34; 318/578
[58] Field of Search ............. 219/124, 125 R, 125 PL,
219/124.34, 124.22, 124.1; 318/575, 576, 578

[56] References Cited

U.S. PATENT DOCUMENTS

| | | | |
|---|---|---|---|
| 3,171,012 | 2/1965 | Morehead | 219/124 |
| 3,408,475 | 10/1968 | Fier | 219/125 R |
| 3,530,273 | 9/1970 | Bollinger et al. | 219/125 PL |
| 3,596,048 | 7/1971 | Maeda | 219/125 PL |

Primary Examiner—Roy N. Envall, Jr.
Assistant Examiner—Clifford C. Shaw
Attorney, Agent, or Firm—Flesichner, Schutz and Henn

[57] ABSTRACT

A guidance system for an automatic welder. A probe having a casing with a concentric actuating rod supported in the casing by means of a pivot plate which is movably mounted on a fixed plate. A probe finger is attached to the lower end of the actuating rod. The upper end of the actuating rod passes through a series of switches which sense movement of the actuating rod in horizontal and vertical planes. Additional switches provide a means for biasing the probe for movement in a given direction without receiving any external signal and effecting two speed travel of the unit. Control relay coils are actuated by the switches resulting in the actuation of motors moving the guidance and welding systems until new information is received from the probe.

13 Claims, 18 Drawing Figures

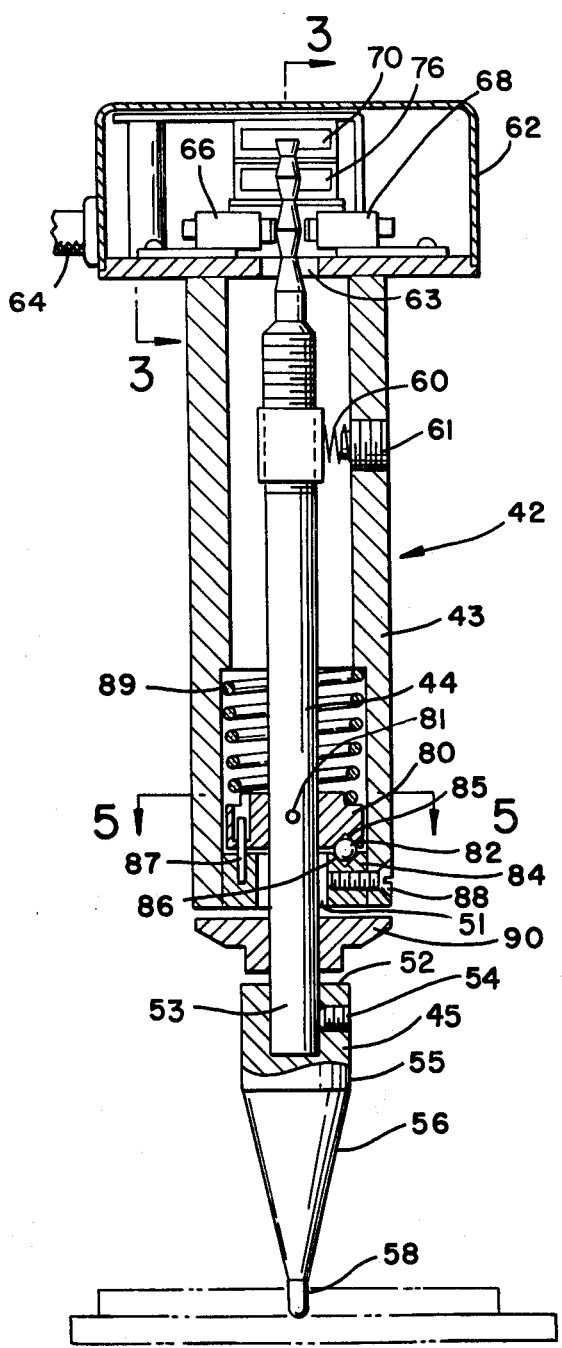
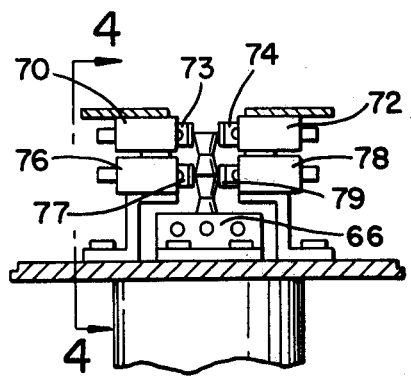
FIG. 3
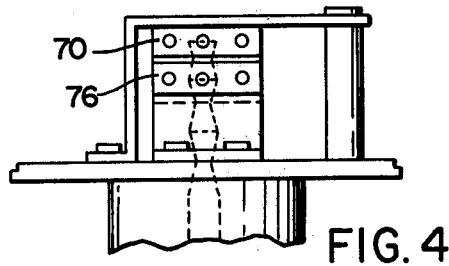
FIG. 4
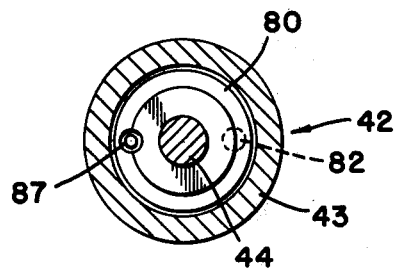
FIG. 5
FIG. 2

4,166,941

GUIDANCE SYSTEM FOR ARC WELDER

CROSS REFERENCE TO RELATED APPLICATIONS

This application is a continuation-in-part of applicant's copending application, Ser. No. 874,153, filed Nov. 5, 1969.

BACKGROUND OF THE INVENTION

In many industrial environments arc welders are used to weld a seam between two workpieces of relatively large size. Preferably a guidance system is used in conjunction with the arc welder in order to reduce the manpower necessary and the time required to make the weld.

Ideally, the guidance system should be able to seek the seam in a workpiece, proceed to it quickly and accurately and start to weld. Lapped joints should be able to be welded by the arc welder by using the guidance system, that is, the guidance system should be able to maintain the head of the arc welder in relation to a given side of a joint.

Various guidance systems have been devised to order to automate arc welding. One known guidance system is the Automatic Groove Follower For Welding Apparatus in the Morehead U.S. Pat. No. 3,171,012. That patent discloses a welding head for depositing flux in a groove and means for moving the work and the welding head relative to each other in a direction generally lengthwise with respect to the groove. Motors are used for the horizontal and vertical movement of the welder.

The probe assembly is mounted in front of the welding head and includes an elongated feeler which is pivotally mounted in order that it may open and close various electrical contacts in accordance with the direction in which the feeler is deflected. An appropriate circuit is associated with the contacts to align the welding head with respect to the groove sensed by the elongated feeler.

There are two significant deficiencies in the Morehead apparatus. The elongated feeler is not capable of making horizontal adjustments unless there are two sides to the seam; that is, the elongated feeler must have a path in which it may travel in order to actuate the contacts which move the head of the arc welder in an appropriate direction. This is particularly a problem where there is a lap joint. By lap joint it is meant that one of the workpieces overlaps another workpiece. In this situation it is desirable to lay a bead or seam at the connecting line. However, in the guidance system of Morehead, the feeler senses the upper workpiece and a signal is sent to the horizontal motor to move the probe and the arc head away from the actual point where the weld is desired.

A similar problem is encountered where there is a deep groove and overlapping beads are required. The initial seam works with the Morehead device. A subsequent seam, however, is erratic due to the fact that the probe senses both of the sides of the groove and the initial bead, and literally bounces back and forth.

Needless to say, it is highly desirable to be able to program the probe so that it abuts against one side of the groove in order to signal the arc welder to lay its seam along the precise line desired.

It is also highly desirable if the accompanying circuitry for the guidance system has dynamic braking to prohibit the motors from coasting to a stop and thereby having the probe and arc welder overshoot its target. That is, it is desirable to bring the arc head to its position as quickly as possible and stop it there in order to maintain the necessary accuracy. Multiple speeds for the movement of the probe and welding head are also desirable to improve the efficiency of the operation. In this area the Morehead device is also deficient.

SUMMARY OF THE INVENTION

A general object of this invention is the provision of a new and improved guidance system for an automatic welder.

Other objects of this invention include the provision of a new and improved guidance system for automatic welders which includes a probe mounted near the welder; which has an actuating rod attached to the probe; which has a probe finger extending from one end of the probe; which includes switching means actuated by the rod; and, which switching means senses movement of the rod in planes substantially perpendicular to the axis of the rod.

Still other objects of this invention include the provision of a new and improved guidance system for automatic welders which includes switching means transmitting signals to the welder in accordance with the movement of a probe; and, which further includes switching means transmitting signals to the welder determined extraneously with respect to the guidance system.

Another object of this invention includes the provision of a new and improved guidance system for automatic welders which causes a probe finger to sense one edge of a lap joint to guide the system in welding a seam along the joint.

Yet another object of this invention is the provision of a new and improved guidance system for automatic welders which includes a probe which energizes motors resulting in the movement of a welder in horizontal and vertical directions, respectively.

A further object of this invention is the provision of a new and improved guidance system for automatic welders which electrically "preloads" a probe to seek an abutment and thereafter cause the welder to follow the abutment.

A still further object of this invention is the provision of a new and improved guidance system for automatic welders which controls operation of the welder in either of two separate speeds with respect to the welder moving towards and away from a desired position.

Yet another object of this invention is the provision of a new and improved guidance system for automatic welders which includes dynamic braking of the motors causing movement of the welder and probe to enable precise positioning and correcting.

Still another object of this invention includes the provision of a new and improved guidance system for automatic welders which obtains one or more of the objects and advantages set forth herein.

These and other objects and advantages of this invention will become apparent from the following description of preferred forms thereof, reference being had to the accompanying drawings.

BRIEF DESCRIPTION OF THE DRAWINGS

FIG. 2 is a side cross-sectional view of the probe of this invention;

FIG. 3 is a cross-sectional view taken along line 3—3 in FIG. 2 and shows the contacts interacting with the actuating rod of the probe;

FIG. 4 is a cross-sectional view taken along line 4—4 of FIG. 3 showing the electrical contacts which are sensitive to horizontal motion of the probe;

FIG. 5 is a cross-sectional view taken along line 5—5 of FIG. 2 and is a top view of the lower section of the probe;

DESCRIPTION OF THE PREFERRED EMBODIMENTS

Figure 1:
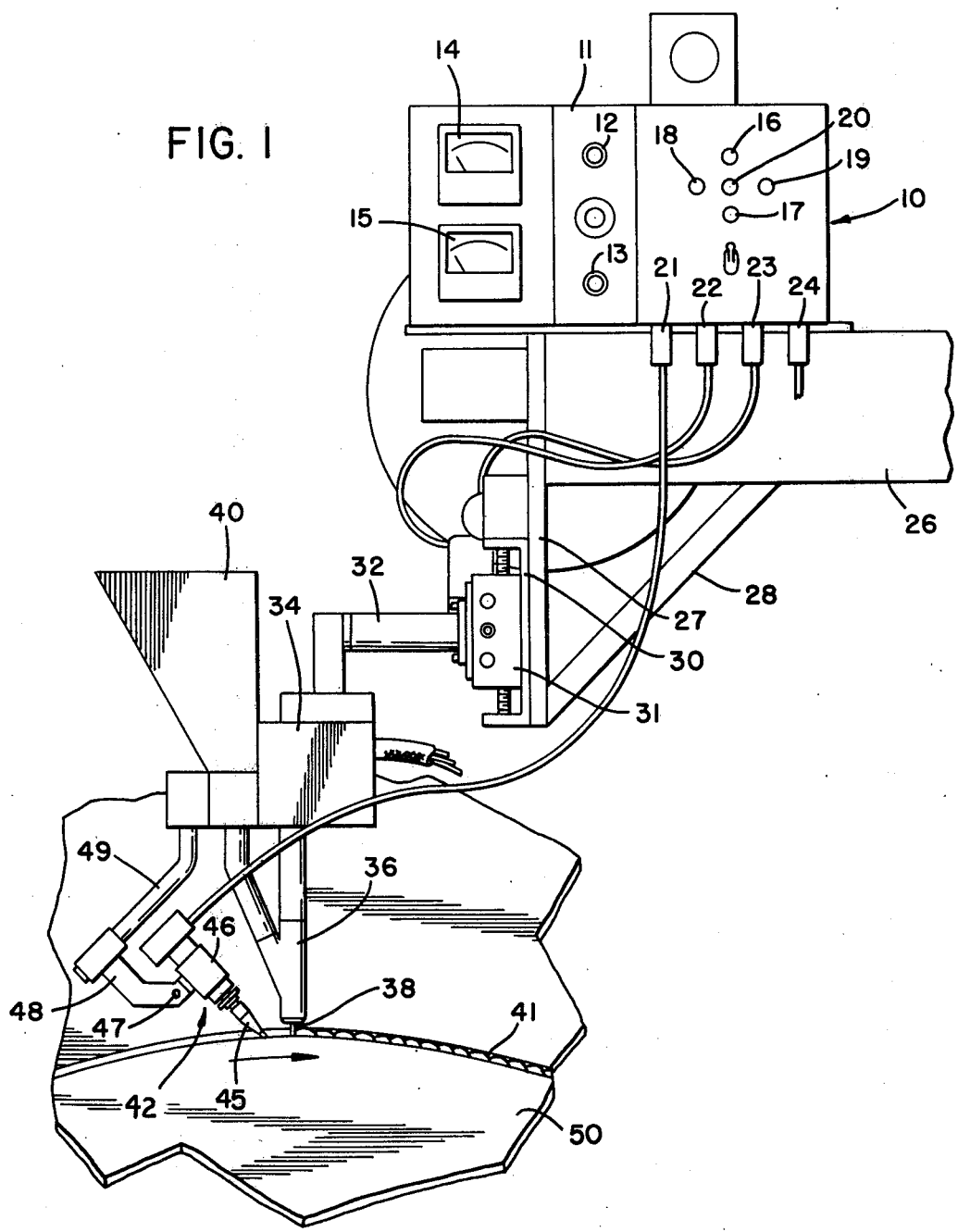
FIG. 1 is a side view of welding apparatus and guidance system.
Figure 6:
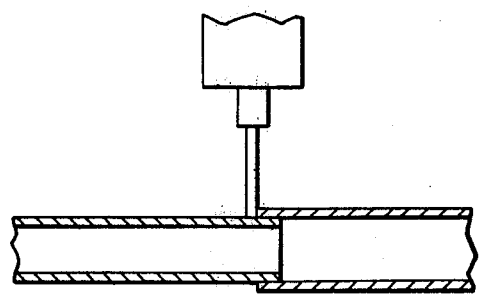
FIGS. 6-13 illustrate various types of workpieces which may be welded with this invention.

As illustrated in FIG. 1, this invention is designed to be used on an arc welder 10, having a control panel 11, which has control knobs 12 and 13 for regulating the current and voltage respectively. A voltmeter 14 and ammeter 15 indicate, respectively, the voltage and current of the arc welder.

Various lights on the control panel indicate the direction in which the unit may be moving. If the unit is moving upwardly, light 16 is lit, whereas if it is moving in the opposite direction, lower light 17 will be illuminated. Similarly, if the unit is moving left, the left light 18 will be lit and if it is moving right, the right light 19 will be on. The center light 20 indicates whether the power is on.

Appropriate outlets 21, 22, 23 and 24 make electrical contact with the different components and contacts in the system as described hereinafter. The entire unit may move horizontally along a beam 26. At one end of the beam 26 is a cross slide 27 which is partially supported on the beam 26 by means of a brace 28.

A cross slide base plate 30 permits a supporting assembly 31 to move vertically. Movement is achieved by appropriate motor driven gears.

An outwardly extending arm 32 from the supporting assembly 31 holds an automatic welding head 34 from which a nozzle tip 36 of the automatic arc welder protrudes. A welding wire 38 extends downwardly from below the nozzle tip 36. In addition to the welding wire 38, flux is fed from a flux hopper 40 to the welding zone to provide a seam 41. Assembly 34 moves horizontally and vertically. While a sub-arc welding head is shown in FIG. 1, it should be understood, however, that this guidance system can be used with other welding systems such as mig and tig.

A probe 42 having a probe finger 45 extending from underneath it is supported by a bracket 46 at about a 45° angle and is hingedly connected at 47 to a brace 48. The brace 48 is supported by a rod 49 to the welding head and flux hopper assembly. As noted from FIG. 1, the workpiece 50 is moving to the right so that the guidance system probe 42 actually precedes the tip of the arc welder. Because of the angular position of the probe the probe finger 45 may move vertically and horizontally without moving in the direction of travel of the workpiece 50.

FIGS. 2 through 5 show detailed views of the probe 42. The probe includes a casing 43 which is generally cylindrical in nature. Within the casing 43 is an actuating rod 44 which extends downwardly concentric with the casing beyond an opening 51 at one end thereof. The actuating rod is connected to a probe finger 45. The probe finger has an opening along its top 52 into which an end 53 of the actuating rod 44 extends. A set screw 54 is threadedly engaged with the probe finger and presses against the actuating rod in order to secure it in position within the probe finger 45.

The probe finger has three distinct areas. The upper area 55 is generally cylindrical in area and extends downwardly to a frusto-conical shaped section 56. A cylindrical tip 58 having a rounded end is connected to the section 56. Other shapes of probe fingers may be used.

The probe 42 is effectively biased in a downward direction by means of a spring 89. The top of the casing 43 is connected to a housing 62 in which various switches are located. The actuating rod 44 extends upwardly through an aperture 63 in the bottom of the housing 62. An appropriate electrical connector 64 is in communication with the switches therein. The upper part of the actuating rod 44 has a series of projections which make contact with the switches.

Switches 66 and 68 are positioned across from each other on either side of the actuating rod. The switch 66 makes contact with the rod 44 as a result of vertical movement of the probe finger 45. Switch 66 is used to sense downward movement and switch 68 senses upward movement. As noted in FIG. 2, the probe is biased to the left and in contact with the switch 66. Closing of the switch 66 results in the circuit, as described in more detail hereinafter, causing the arc welder and probe to move downwardly until pressure is relieved from the switch 66 due to contact with the workpiece. If the pivot rod 44 should continue to feel upward pressure it would contact switch 68. This would cause the vertical motor to move the slide upwardly until pressure is relieved on switch 68. Horizontal switches 70 and 72 are used to gauge the side-to-side movement of the mounted guide and arc welder.

That is, when the tip 58 of the probe is moved, due to meeting an abutment of some kind, to one side or the other, an electrical contact is closed, an appropriate motor is actuated, and the arc welder is moved until pressure from the abutment is released. Switches 70 and 72 have plungers 73 and 74, respectively. Additional switches 76 having a plunger 77, and 78 having a plunger 79 are also positioned in the same manner as the horizontal switches 70 and 72. Switches 76 and 78 are positioned immediately below the horizontal switches 70 and 72 respectively. The switches 76 and 78, however, are used in the circuitry to cause the probe to seek an abutment or edge to the left or right of the probe, make contact with it and maintain its position along it, as described below in more detail.

Figure 7:
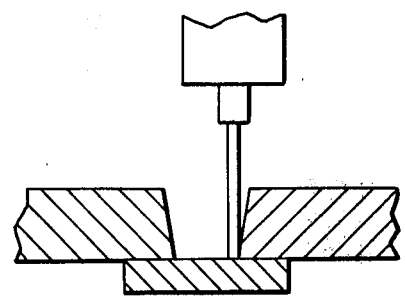

FIGS. 6 through 13 illustrate the various manners in which different probes may be used. In the configuration shown in FIGS. 6 and 7 the probe would be preloaded to the right. That is, the probe would follow the abutment and maintain contact with it. Moreover, as shown in FIG. 7 a longer probe may be used if the depth of a seam requires such an arrangement.

Figure 8:
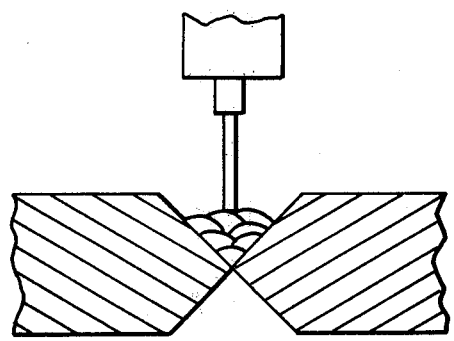
Figure 10:
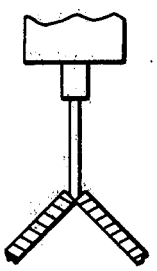

As illustrated in FIG. 8 the probe may be used to make several passes in a V-groove. In this respect, if it were desired to have the probe move along either edge of the V in FIG. 8 the probe is preloaded to the left or right. FIG. 10 shows a similar situation where the probe tracks through the center of the groove.

Figure 9:
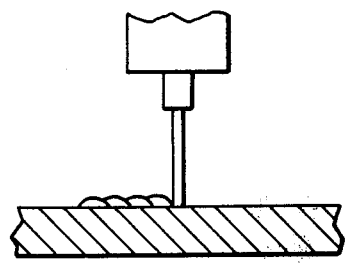
Figure 11:
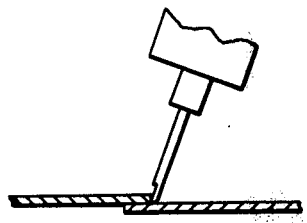

FIGS. 9 and 11 show the type of situation where preload left is used. That is, where the probe follows along the edge of an abutment such as FIG. 11 or a seam as in FIG. 9.

Figure 12:
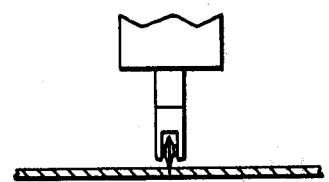

FIG. 12 shows a different type of probe which consists of two downwardly extending spaced apart arms. The arms straddle a ridge which is to be welded. In this manner a bead is laid along the very apex of the ridge.

Figure 13:
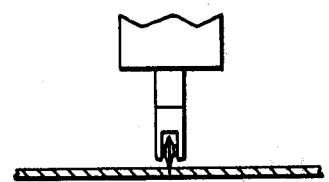

A roller probe as illustrated in FIG. 13 is used where a very high degree of accuracy is desired for a very small seam. That is, the roller moves along the crack between two abutting pieces of metal. In this way any movement to the left or right of the seam is immediately detected by the probe.

The actuating rod 44 is allowed to pivot within the casing 43 by means of a pivot plate 80 mounted on a pivot ball 82 on a fixed plate 84. The pivot plate 80 is fixedly attached to the actuating rod 44 by a pin 81. The pivot ball 82 is located in V-shaped grooves 85 and 86. The pivot plate 80 is prohibited from rotating on the fixed plate 84 by a pin 87 which is loosely held by the pivot plate 80 to allow pivoting of the plate 80. The fixed plate 84 is held in position against the casing by means of a set screw 88. A spring 89 is positioned between the casing 43 and the pivot plate 80 to maintain the actuating rod in a downward direction. An abutment plate 90 is positioned on the lower end of the actuating rod 44 and below the casing 43 in order to prevent the entrance of dirt or foreign matter into the assembly through opening 51.

FIG. 2 illustrates a spring 60 in an abutting relationship with the actuating rod 44. The function of the spring 60, as shown in the figure, is to impart to the actuating rod 44 some degree of resistance to movement in the horizontal plane. The amount of resistance so imparted may be adjustably selected by altering the position of a set screw 61. This resistance to the movement of the actuating rod 44 results in the reaction of the rod 44 to changes in the path occurring more quickly. A similar feature may be designed into the system with respect to the vertical plane of actuating rod movement. Although the figures do not depict such a design, a spring inserted into an apeture through the actuating rod and biased in an axial direction produces the desired vertical resistance without effecting horizontal movement.

Switch 72 is positioned immediately beside the actuating rod in the probe and below the switch 78. The switch 72 closes at a later time than switch 78 because the probe moves in an arc and naturally contacts the higher of two vertically placed switches first. As a result of this time sequence of closing switches, additional functions can be performed by the guidance system as explained hereinafter with reference to FIGS. 16-18.

As utilized, the probe 42 will actually have about a 45° angle from that pictured in FIG. 2. In this manner, vertical movement of the probe finger 45 is transmitted to either the switch 66 or switch 68. Side-to-side or horizontal movement will cause the probe to move and contact the switches 70 or 72.

Figure 14:
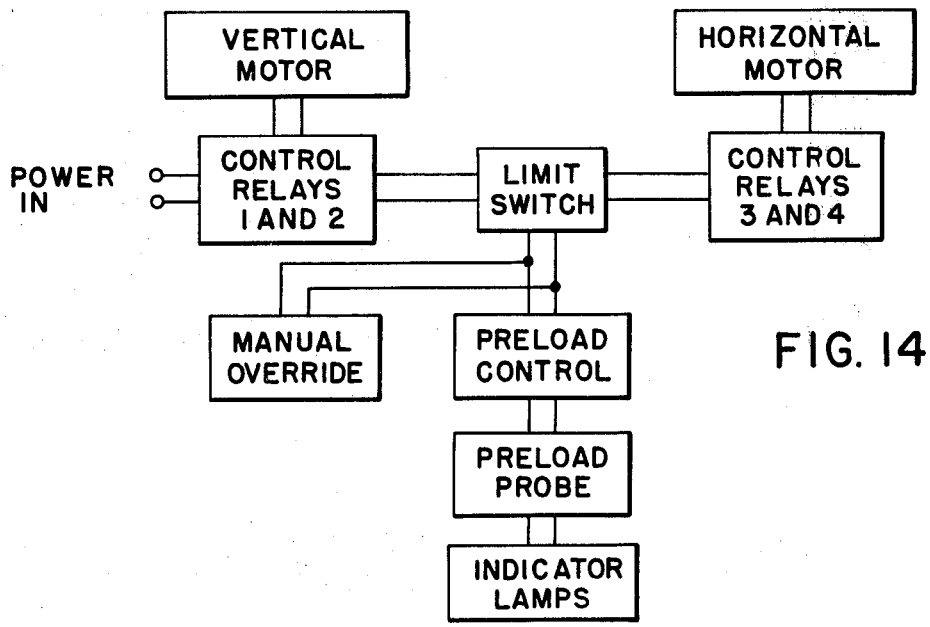
FIG. 14 is a block diagram of the basic unit.

FIG. 14 is a block diagram of the operation of the basic unit. Power is supplied to motors, control relays and the probe which may be preloaded or biased to move in a given direction. The probe signals the preload controls which transmits the signals to control relays one through four for the horizontal or vertical motors. If the limit switches have been opened because of an extreme position of the unit the signals will not be transmitted. For example, if the workpiece should slope downwardly and require that the probe be driven downwardly, control relay 2 will signal the vertical motor to drive the unit downwardly. If, at any time, a vertical limit on the slide is reached, a switch will open the circuit and stop the motor to prevent damage to the slide itself.

If the probe indicates that horizontal motion is required to keep the welding head in the proper position, control relays 3 and 4 will be energized to drive the horizontal slide to the right or left direction. Again, limit switches stop all motion in order to protect the guidance system and arc welder when the corresponding limit is reached. If the unit is to proceed to the left, relay 3 is energized; if the unit is to proceed to the right, relay 4 is energized. If the unit is preloaded to the left, relay 3 will automatically sense and drive the unit to the left, until the probe strikes a side of the previous bead, a lap joint or some other obstacle. At this time, relay 3 will open, thus stopping the horizontal motion.

Figure 15:
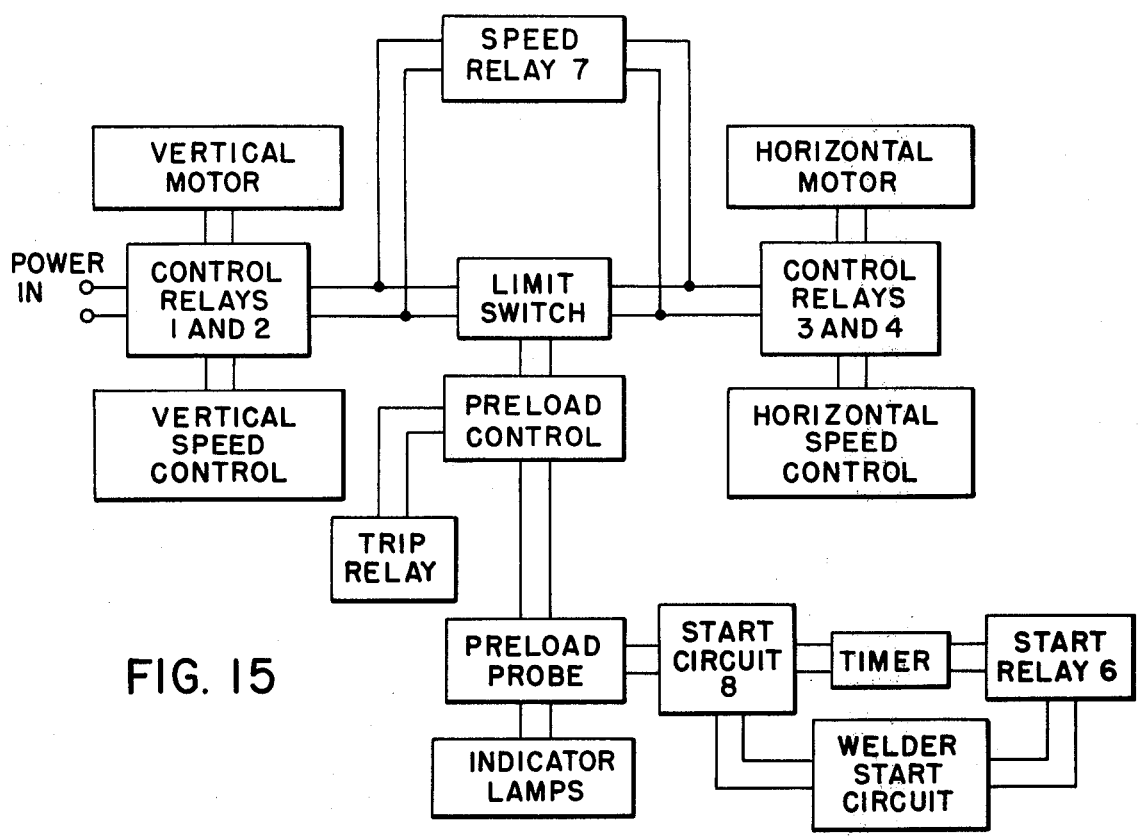
FIG. 15 is a block diagram of one embodiment of this invention having a timing mechanism.

FIG. 15 is a block diagram of a system similar to that shown in FIG. 14. It has, however, an automated starting and stopping system which may be used in welding units where high speed and repeatability are desired. An example of such a unit would be a small tank of some type. The unit is started in operation automatically when the operator places a small part into a welding jig (not shown) and actuates the jig in order to move the workpiece or part. If a preload has been programmed in, the probe will move to the left or right depending on which way the preload is set. When the probe locates the seam, the unit will stabilize itself and the welder and timer will begin. The workpiece is turning at this time. If the workpiece is a tank or some other circular object, the welder will eventually reach its starting point. When the starting bead is reached, the timer will take control away from the probe and stop it, thus preventing it from riding up over the starting bead. When the starting bead is reached with the welding head, the operator stops the welding arc and removes that part from the jig.

Horizontal and vertical speed control permits the probe to move in and out of position at two different speeds. That is, control relays 1 and 2 and control relays 3 and 4 can be utilized to make the unit move at different speeds. In this manner, the guidance system will make the arc welder head move to and away from the workpiece relatively fast when the distance to be travelled is great. The unit is programmed to move slowly when it is nearer a welding position.

Figure 16:
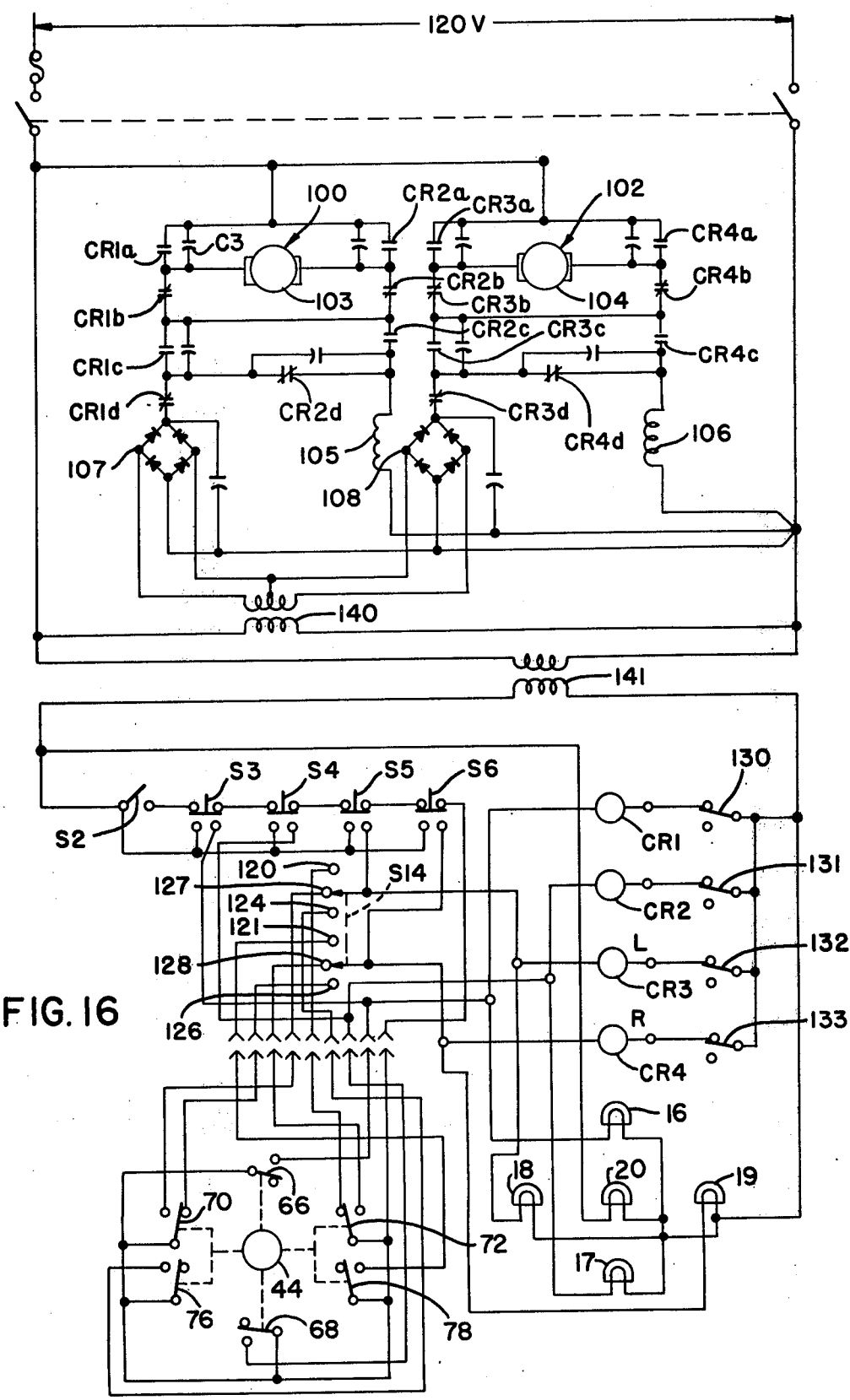
FIG. 16 is a schematic diagram of the basic electrical circuitry of this invention.

FIG. 16 shows the basic circuitry used in the guidance system of this invention. The horizontal and vertical sections of the circuitry are identical in all respects except with the direction in which they drive the probe. A 120 volt source actuates a vertical motor 100 and a horizontal motor 102 having armatures 103 and 104, respectively. The motor field windings 105 and 106 are used with the armatures 103 and 104, respectively. The field windings 105 and 106 have bridges 107 and 108, respectively across them which converts the alternating current to a full wave direct current and acts as a constant voltage source for the motor field windings for the purpose of dynamic braking. Dynamic braking of the motor armature is necessary in this guidance system and invention in order to prevent the electric arc and probe from over-correcting due to coasting of the motor after power to it has ceased. In order to obtain dynamic braking at all times, including the period when no signals are being transmitted to the motor the motor field windings are impressed with a constant voltage from the bridges. The D.C. voltage is directed to establish a counter e.m.f. which acts to stop the rotation of the armature. There is a distinct advantage in this system over normal dynamic braking which simply shorts the armature. In the usual system the voltage across the field winding decreases as the motor slows down. This invention, however, provides a constant voltage across the field winding and thus provides the maximum braking forces on the armature.

Control relay contacts CR 1 through CR 4 correspond to the electromagnetic coils CR 1 through CR 4 respectively. That is, when any one of the coils is actuated, the contacts with the same notation are changed from the positions shown in FIG. 16. For example, if coil CR 1 were energized, all the normally closed contacts CR 1 would open and all the normally open contacts CR 1 would close.

Manual override switches S 3, S 4, S 5 and S 6 are used to override the signals from the probe and move the guidance system up, down, left or right respectively. Any one of these switches cut out the probe circuitry and immediately activate one of the control relay coils thus causing a motor to move the entire unit. Switch S 2 is a switch which must be closed to provide power to the entire probe unit. Control relays CR 1, CR 2, CR 3 and CR 4 when actuated, respectively, drive the probe and arc up, down, left and right. As indicated above the lights 16, 17, 18, 19 and 20 are used to indicate the direction in which the unit is moving. Light 20 simply indicates that the power is on. The rest of the lights are positioned around the light 20 and indicate, respectively, in numerical order whether the unit is moving up, down, left or right.

Switches 66 and 68 are located on the probe and when closed cause the vertical motor to move the unit up or down, respectively.

Two separate switches are provided for movement in the horizontal plane. Switches 72 and 70 are positioned across from each other on either side of the actuating rod 44 in the probe. Switches 72 and 70 cause the welding unit to move to the right or left, respectively, when there is no bias or preload programmed into the circuit.

Switches 72 and 70 may also function to bias the probe to the right or left. This bias or preload condition is used when it is desired to have the probe seek an abutment or seam and weld along it. A left preload condition is programmed into the probe by moving the switch S 14 to the upper contact 120 and 121. When in this position the current flows through switches S 2 to S 6 into the common line for switches 66, 68, 70, 72, 76 and 78. Each of the switches except 72, however, leads to an open circuit. Switch 72 completes a circuit through contact 120 to the control relay coil CR 3. Activation of the coil CR 3 opens normally closed contacts CR 3b and CR 3d. This configuration of contacts allows current to pass through now closed contact CR 3a, through the motor armature 104 from left to right, through normally closed contact CR 4b, through the now closed contact CR 3c, through normally closed contact CR 4d and through the motor field 106. The positions of the contacts corresponding to the relays CR 3 and CR 4 permit current to flow to the coil winding 106. More specifically, the current flows through now closed contact CR 3a, through the motor 102 from left to right, through the normally closed contact CR 4b, through the now closed relay contact CR 3c, through the normally closed contact CR 4d and through the field winding 106. Since everything is actuated the motor 102 therefore drives the probe and welding unit to the left.

The probe and arc welder will continue to move to the left until the probe finger engages an abutment. At this point, the actuating rod pivots and actuates switch 72 thus opening the circuit and stopping the motor 102.

When switch S 14 is in the preload left condition, switch 70 merely goes to an open circuit in either of its positions and therefore is not relevant. Switch 76 is also out of the circuit in a preload left condition. Switch 78 leads to contact 121 which is contacted by switch S 14 in a preload left condition. Should the probe not feel the pressure of the abutment, the switch 72 will go to its original position to the left as shown in FIG. 16 and actuate the horizontal motor 102 as explained above. The probe will then move to the left until it reaches the seam. If the seam should move to the right, switch 78 will be closed. This completes a circuit through contact 121 and activates control relay coil CR 4. Normally open relay contacts CR 4a and CR 4c thus close, and normally closed relay contacts CR 4b and CR 4d open. These circumstances cause the motor 102 to drive the probe to the right.

Still referring to FIG. 16, the probe can be preloaded to the right by moving switch S 14 to contacts 124 and 126. In this manner only switch 70 completes a circuit without any pressure on the probe and drives the probe to the right until an abutment is met which changes the position of switch 70. At this time, switch 76 acts as a signalling switch to drive the probe to the left when that is necessary.

Switches 66 and 68 are closed by movement of the probe in the vertical direction. For example, if the probe engages a rising surface, switch 66 is closed, which activates control relay coil CR 1. Normally open control relay contacts CR 1a and CR 1c close and normally closed control relay contacts CR 1b and CR 1d open. The motor 100 thereby drives the unit upwardly until the pressure is relieved from the probe.

When there is a no preload condition; that is, when the switch S 14 is in contact with contacts 127 and 138, the switches 78 and 76 are removed from the circuit and have no effect thereon regardless of their relative positions. At this time switches 72 and 70 govern the horizontal movement. That is, the probe moves in a straight line until it meets a horizontal obstacle. It then moves and changes the position of switch 72 or 70. As explained earlier, either control relay CR 3 or CR 4 is activated and causes motor 102 to move the unit to the left or right.

Switches 130, 131, 132 and 133 are limit switches and are placed at the end of the horizontal and vertical slides on which the unit travels in order to prohibit any excessive motion and therefore any damage. That is, once the guidance system has moved to its extreme position the limit switch automatically opens and causes the entire unit to stop.

The lights 16 through 19 are connected into the circuit for the coils in the control relays CR 1 through CR 4 and indicate the direction in which the unit is being driven at that time. Light 20 is connected directly into the power source and indicates that power is being supplied to the entire unit.

It should also be noted that the probe is normally biased in a downwardly direction. This is done so that the probe stays in contact with the workpiece.

Stepdown transformer 141 is used in the circuit to reduce the voltage to the probe. This greatly reduces the possibility of serious shock to anyone if a short should occur in the probe.

Figure 17:
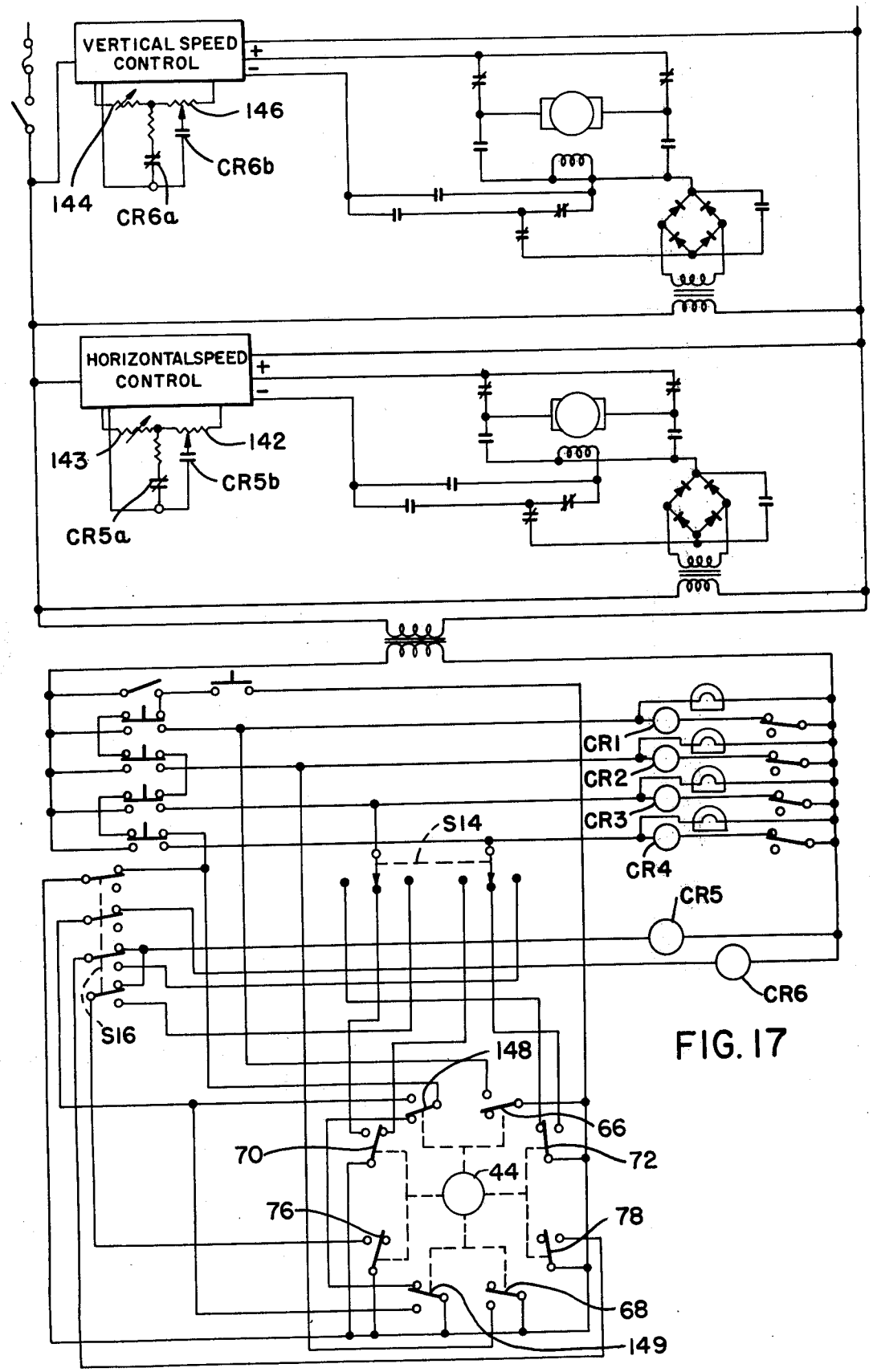
FIG. 17 is a schematic diagram of the circuitry for two-speed probe travel.
Figure 18:
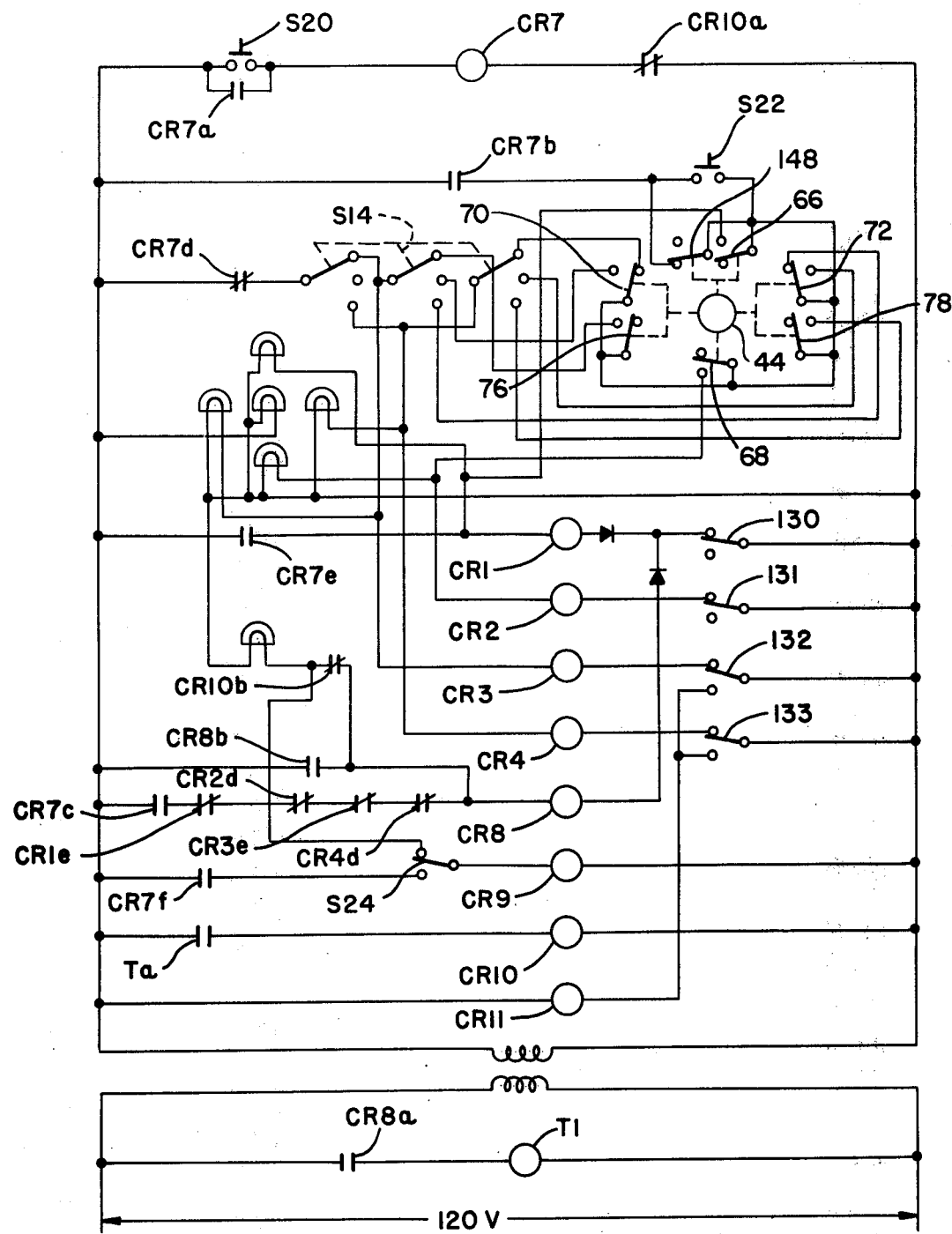
FIG. 18 is a schematic diagram of this invention which utilizes a fully automatic timed unit.

FIG. 17 shows substantially the same circuitry shown in FIG. 16, except that it contains one additional feature. A two speed control for both the vertical 100 and horizontal 102 motors is included with the circuitry. Since the circuit is substantially the same as that described above, the details of the probe circuitry and control relays for moving the motors will not be discussed. The circuitry of FIG. 17 include a four-way switch S 16. In the position shown in FIG. 17 switch S 16 is positioned to eliminate the preload function of the probe and replace it with speed control. Again, there are two sets of horizontal switches in FIG. 17 shown as 72, 70, 78 and 76. Switch 78 is positioned immediately below 72 on the probe and as mentioned earlier will be actuated at a slightly later time because it is nearer the pivot point than 72. Moreover, the position of switch 78 may be adjusted along the horizontal plane by means of a set screw (not shown in the figures) which is provided in the probe. When the probe abuts against an obstacle to the left or if the seam goes to the left, the switch 72 is moved. When this occurs, the coil of control relay CR 4 will be activated thus changing all of the contacts corresponding to relay CR 4, moving the horizontal speed control motor 102 to motivate the probe to the right. However, should the probe be moved further to the right than its earlier position, contact 78 will also be closed thus activating control relay CR 5 which opens normally closed contact CR 5a and closes normally opened contact CR 5b. In this manner, a low speed adjustment 143 will be effectively removed from the circuit and the high speed adjustment 142 will be placed in the circuit.

As the probe moves back to its neutral position quickly, switch 78 is moved before switch 72. At that point, control relay CR 5 and its contacts will revert to their original positions and the low speed adjustment 143 will come back into effect. The probe will slow down but continue its movement until it reaches its unbiased or satisfied position. Thereupon, 72 will also move back to its normal position and the probe and arc welder will move along their predetermined path.

Additional switches 148 and 149 are provided for high speed motion in the vertical direction. Accordingly, control relay coil CR 6 and control relay contacts CR 6a and CR 6b with low speed adjustment 144 and high speed adjustment 146 operate in the same fashion as that described above.

FIG. 18 again depicts basically the same type of circuitry illustrated in FIG. 16. However, FIG. 18 includes a system which makes the probe movement completely automatic. This type of unit is particularly useful when a series of items which are identical are being welded. An example of such an item is a rim or bowl which requires that a seam be welded around its circumference. In this situation, each piece is generally the same size and takes the same amount of time to weld. Accordingly, a timer is provided which gauges the amount of time for welding and stops once that time has elapsed. Moreover, once the time has elapsed, the probe moves to a predetermined position away from the workpiece. When a new workpiece is placed in position and a signal is given by means of a single switch, the probe will automatically go to the correct position, guide itself along the seam while leading the welding head, complete the weld and retract to its original position.

The motor circuitry is not shown in this figure but it is identical to that discussed above. To start the operation, control relay coil CR 7 is energized when switch S 20 is depressed. Normally open contacts CR 7a closes, locking in control relay coil CR 7 and allowing switch S 20 to be released.

As mentioned above, due to the spring pressure of springs 60 and 89, FIG. 2, the probe is always preloaded down. The preload switch S 14 is set to right preload and when normally open contact CR 7b closes power is supplied to switches 66, 68, 70, 72, 76 and 78 through a normally closed contact of switch 148.

The welding head and probe moves down and right until the workpiece is found. The speed controls are set so that the probe touches the workpiece and stops the downward motion before the horizontal motion. When the probe touches the workpiece, the head and probe continue to the right until it finds the seam. When the seam is found, all motion stops and control relays CR 1, CR 2, CR 3 and CR 4 deenergize. Normally open CR 7c is closed and the circuit is completed through relay contacts CR 7c, CR 1e, CR 2d, CR 3e and CR 4d to energize control relay coil CR 8. When coil CR 8 is energized, normally open contact CR 8b is closed and holds control relay coil CR 8 in. Normally open contact CR 8a closes and energizes the timer T 1. A normally open contact (not shown in the figures) of control relay coil CR 8 also closes and starts the welder.

When the starting bead is reached, switch 148 located in the probe below the switch 66 actuates due to the abrupt change in height. Switch 148 is positioned physically within the probe so it is only sensitive to abrupt changes. This opens the path of power to the probe and prevents the welding head from lifting before the weld is complete. When the weld has been completed the timer T 1 has timed out. When the timer T 1 is timed out, a contact T a corresponding to the timer closes and energizes control relay coil CR 10. When the control relay coil CR 10 is energized, normally closed contact CR 10b opens and stops the welder. Normally closed contact CR 10a opens and de-energizes control relay coil CR 7. When control relay coil CR 7 is de-energized the normally open switch CR 7b opens removing control of the probe, normally closed contact CR 7e closes and energizes control relay coil CR 1 which drives the welding head and probe up. Normally closed contact CR 7d closes and through a third section of the preload switch S 14, drives the welding head to the left in this case or opposite the direction of the preload. When the slide hits the up limit switch 130, control relay coil CR 8 de-energizes. When control relay coil CR 8 is de-energized the contact CR 8a opens, resetting the timer T 1. If, while welding, one of the horizontal limit switches 132 or 133 are actuated, control relay coil CR 11 energizes which cuts off the welder.

Control relay coil CR 9 is used in conjunction with a rapid traverse system. Switch S 24 selects either high speed movement to and from the workpiece or away from the work only.

Switch S 22 is used to bypass switch 148 and return power to the probe in cases where the cut-off circuit is not wanted.

Modifications, changes and improvements to the preferred forms of the invention herein disclosed, described and illustrated may occur to those skilled in the art who come to understand the principles and precepts thereof. Accordingly, the scope of the patent to be issued hereon should be limited to the particular embodiments of the invention set forth herein, but rather should be limited by the advance by which the invention has promoted the art.

What is claimed is:

1. A guidance system for an arc welder including a welding head comprising a probe, means moveably mounting the probe in the vicinity of the welding head, an actuating rod moveably mounted within the said probe, control means causing movement of said arc welder, first switching means sensing movement of the actuating rod and transmitting signals to the control means, motor means operatively attached to the probe and the welding head, second switching means resulting in direct movement of the probe upon activation, said second switching means manually activated by an operator, and circuit means actuating the said motor means in response to signals from said first and second switching means.

2. The guidance system according to claim 1 in which the second switching means includes a plurality of electrical switches adjacent the actuating rod effecting the said circuit means causing the probe to move until pressure on the actuating rod changes the position of the plurality of electrical switches and deactuates the said motor.

3. The guidance system according to claim 1 in which said motor has a field coil, armature and circuit means which when activated supplies a constant voltage to the field coil while short circuiting the armature in order to provide dynamic braking.

4. The guidance system according to claim 1 in which said circuit means includes a timer and switch means deactivating the control means after a predetermined time and circuitry activating the welding head upon predetermined positioning of the probe; the circuit means acting with the first and second switching means causing the probe to seek the workpiece, find it and activate the welding head whereby a workpiece is welded until the timer deactivates the welding head after a predetermined time.

5. A guidance system for an arc welder having a welding head comprising a probe mounted in the vicinity of the welding head, an actuating rod moveably mounted within said probe, motor means causing movement of the probe and the welding head relative to the surface of a workpiece to be welded, first switching means sensing movement of the actuating rod, second switching means resulting in direct movement of the probe and welding head, switch means manually activated by an operator energizing said second switching means, and circuit means activating the said motor means in response to signals produced by said first and second switching means.

6. The guidance system according to claim 5 in which the first switching means includes a plurality of electrical switches adjacent the actuating rod which result in movement of the probe by producing signals due to the pressure of the actuating rod contacting at least one of said electrical switches.

7. A probe for a guidance system of an arc welder comprising a casing having an aperture at the top and bottom thereof, an actuating rod in the casing and generally parallel thereto, means pivotally supporting the actuating rod in the casing and preventing any substantial movement along the axis of the actuating rod, an extension of the actuating rod extending beyond the aperture at the bottom of the casing sensing a seam of a workpiece to be welded, control means causing movement of the arc welder along the workpiece, first switching means sensing movement of the actuating rod and transmitting signals to the control means, and second switching means manually activated by an operator resulting in direct movement of the probe.

8. The probe according to claim 7 in which the actuating rod is supported along its length by a fixed plate inside the casing and a pivot plate is positioned concentrically adjacent to and supported by the fixed plate by means of a pivot ball.

9. The probe according to claim 8 in which spring means in positioned intermediate said pivot plate and said casing whereby the pivot plate is constantly forced in the direction of the extension of the casing and stop means on the actuating rod positioned intermediate the casing and the extension in order to prevent any substantial axial movement of the actuating rod.

10. The probe according to claim 7 in which the extension of the actuating rod is a conical shaped tip.

11. A probe for a guidance system of an arc welder including means causing relative movement between the probe and a workpiece comprising an actuating rod moveably mounted with respect to the probe, control means causing movement of said arc welder, said actuating rod sensing the surface of the workpiece, first switching means sensing movement of the actuating rod and transmitting signals to the control means, second switching means resulting in direct movement of the probe, and switch means manually activated by an operator energizing said second switching means.

12. The probe according to claim 11 in which the said first switching means includes a plurality of electrical switches resulting in movement of the probe when activated by pressure due to the movement of the actuating rod.

13. The probe according to claim 11 in which the said second switching means includes at least one electrical switch which when activated by the switch means manually activated by an operator results in a predetermined movement of said probe regardless of the signals from said first switching means.

* * * * *